United States Patent
Chen

(10) Patent No.: US 9,652,689 B2
(45) Date of Patent: May 16, 2017

(54) MAGNIFICATION FACTOR ESTIMATION DEVICE AND METHOD FOR SAME

(71) Applicant: EIZO Corporation, Ishikawa (JP)

(72) Inventor: Haifeng Chen, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 77 days.

(21) Appl. No.: 14/695,059

(22) Filed: Apr. 24, 2015

(65) Prior Publication Data

US 2015/0227812 A1 Aug. 13, 2015

Related U.S. Application Data

(63) Continuation of application No. PCT/JP2013/069841, filed on Jul. 23, 2013.

(30) Foreign Application Priority Data

Oct. 31, 2012 (JP) .................................. 2012-240397

(51) Int. Cl.
*G06K 9/46* (2006.01)
*G06K 9/52* (2006.01)
(Continued)

(52) U.S. Cl.
CPC .................. *G06K 9/52* (2013.01); *G06K 9/46* (2013.01); *G06K 9/4604* (2013.01); *G06T 7/00* (2013.01);
(Continued)

(58) Field of Classification Search
CPC .......... G06K 9/52; G06K 9/46; G06K 9/4604; G06K 2009/4666; G09G 2340/0407; G09G 5/395; G09G 5/39; H04N 1/393; H04N 1/3935; G06T 3/40; G06T 7/0085
See application file for complete search history.

(56) References Cited

U.S. PATENT DOCUMENTS 3,592,547 A * 7/1971 Noble ..................... G06E 3/001
356/71
5,345,259 A * 9/1994 Shibazaki ............. H04N 5/208
348/26
(Continued)

FOREIGN PATENT DOCUMENTS

JP 2006-050494 A 2/2006
JP 2007-249392 A 9/2007
(Continued)

OTHER PUBLICATIONS

International Search Report for International Application No. PCT/JP2013/069841, issued by the Japanese Patent Office on Aug. 27, 2013.

*Primary Examiner* — Ali Bayat

(57) ABSTRACT

A magnification factor is estimated for a magnified image. A generating means generates an image by removing a high frequency component from an input image. A first calculating means calculates a high frequency component greater than or equal to a prescribed frequency component in the spatial frequency component of the input image, as a spatial frequency component characteristic value. A second calculating means calculates the spatial frequency component of the input image, as a second spatial frequency component characteristic value. A determining means determines whether each pixel is block noise. A magnification factor estimating means removes pixels determined to be block noise by the determining means from summation target pixels and, estimates the magnification factor of the input image to be higher when the difference between the first spatial frequency component characteristic values and second spatial frequency component characteristic values of the remaining pixels is smaller.

17 Claims, 22 Drawing Sheets

(51) Int. Cl.
 *G06T 7/00* (2017.01)
 *H04N 1/393* (2006.01)
 *H04N 1/409* (2006.01)
 *G06T 7/13* (2017.01)

(52) U.S. Cl.
 CPC ............ *G06T 7/13* (2017.01); *H04N 1/3935* (2013.01); *H04N 1/409* (2013.01); *G06K 2009/4666* (2013.01); *G06T 2207/20021* (2013.01); *G06T 2207/20044* (2013.01)

(56) References Cited

U.S. PATENT DOCUMENTS

| | | | |
|---|---|---|---|
| 2001/0013959 A1* | 8/2001 | Long | G03H 1/041 359/2 |
| 2003/0132946 A1* | 7/2003 | Gold | G06T 5/20 345/611 |
| 2006/0126083 A1 | 6/2006 | Kurumisawa et al. | |
| 2007/0041640 A1 | 2/2007 | Tabata et al. | |
| 2010/0189374 A1 | 7/2010 | Tsukioka | |
| 2011/0095171 A1* | 4/2011 | Kaneko | G01D 5/38 250/231.1 |
| 2011/0169977 A1* | 7/2011 | Masuda | G06K 9/036 348/222.1 |

FOREIGN PATENT DOCUMENTS

| | | |
|---|---|---|
| JP | 2009-004952 A | 1/2009 |
| JP | 2009-157449 A | 7/2009 |

* cited by examiner

*FIG. 4*

|    |    |    |
|----|----|----|
| −1 | 0  | 1  |
| −2 | 0  | 2  |
| −1 | 0  | 1  |

*FIG. 16A*

|    |    |    |
|----|----|----|
| −1 | −2 | −1 |
| 0  | 0  | 0  |
| 1  | 2  | 1  |

*FIG. 16B*

| 1 | 2 | 1 |
|---|---|---|
| 1 | 2 | 1 |
| 2 | 4 | 2 |
| 2 | 4 | 2 |
| 3 | 6 | 3 |
| 3 | 6 | 3 |
| 3 | 6 | 3 |
| 4 | 8 | 4 |
| 3 | 6 | 3 |
| 3 | 6 | 3 |
| 3 | 6 | 3 |
| 2 | 4 | 2 |
| 2 | 4 | 2 |
| 1 | 2 | 1 |
| 1 | 2 | 1 |

FIG. 19

MAGNIFICATION FACTOR ESTIMATION DEVICE AND METHOD FOR SAME

BACKGROUND

The contents of the following Japanese patent application are incorporated herein by reference: No. 2012-240397 filed in JP on Oct. 31, 2012.

1. Technical Field

The present invention relates to a magnification factor estimation device, particularly to estimating a magnification factor of an image.

2. Related Art

Patent Document 1 discloses, as technology for determining the resolution of an input image, technology for determining the resolution by counting the number of horizontal pixels or the number of vertical pixels of an image, i.e. the period from the rising to the falling of an enable signal indicating an effective period of an image.

Patent Document 1: Japanese Patent Application Publication No. 2006-166188

With the determination method disclosed in Patent Document 1, there is the following problem. When there is blurring as a result of the magnification process, for example, the resolution cannot be accurately determined. In such a case, when an edge enhancement process is performed based on the blurred image, the edge enhancement becomes excessive or insufficient.

It is an object of the present invention to solve the above problem and provide a method and apparatus for determining the magnification factor of an image that has undergone a magnification process.

SUMMARY

The above and other objects can be achieved by combinations described in the claims. According to a first aspect of the present invention, provided is a magnification factor estimation device that estimates a magnification factor of an input image, comprising a first calculating means that calculates a prescribed high frequency component of the input image, as a first spatial frequency component characteristic value; a second calculating means that calculates a spatial frequency component of the input image, as a second spatial frequency component characteristic value; and a magnification factor estimating means that estimates the magnification factor of the input image to be higher when a ratio of the first spatial frequency component characteristic value to the second spatial frequency component characteristic value is smaller. In this way, by calculating a prescribed high frequency component of the input image as a first spatial frequency component characteristic value, calculating a spatial frequency component of the input image as a second spatial frequency component characteristic value, and estimating the magnification factor based on the ratio between these values, the magnification factor can be estimated easily and accurately even for a magnified image.

According to a second aspect of the present invention, provided is a magnification factor estimation device in which the first spatial frequency component characteristic value and the second spatial frequency component characteristic value are obtained by calculating, for each pixel, a one-pixel difference value that is a total sum of absolute values of differences in pixel values between the pixel and prescribed surrounding pixels, and calculating the total sum of the one-pixel difference values. Accordingly, the amount of the high frequency components included can be obtained from the pixel differences of pixels surrounding the pixel of interest.

According to a third aspect of the present invention, provided is a magnification factor estimation device in which a generating means generates a high-frequency-removed image obtained by removing high frequency components of pixels positioned, with respect to a pixel of interest, in a horizontal direction, a vertical direction, and a diagonal direction in a rectangular pixel region, from the spatial frequency component of the input image. Accordingly, the prescribed high frequency component of the input image can be easily removed.

According to a fourth aspect of the present invention, provided is a magnification factor estimation device comprising a determining means that determines whether each pixel is block noise, in which the magnification factor estimating means removes pixels determined to be block noise by the determining means from the pixels that are targets in the total summation. Accordingly, the block noise can be removed and an accurate magnification factor can be obtained.

According to a fifth aspect of the present invention, provided is a magnification factor estimation device in which the determining means includes a difference value calculating means that calculates differences between a pixel value of a pixel of interest and pixel values of a prescribed number of pixels in a left and right direction sandwiching the pixel of interest and differences between a pixel value of the pixel of interest and pixel values of a prescribed number of pixels in an up and down direction sandwiching the pixel of interest; and a block noise pixel determining means that determines the pixel of interest to be block noise when a trend of the calculated difference values is a one-direction increasing trend or a one-direction decreasing trend in both the left and right direction and the up and down direction. Accordingly, the block noise boundary positions can be detected easily and accurately.

According to a sixth aspect of the present invention, provided is an edge extraction threshold value calculation apparatus comprising an edge extraction threshold value changing means that changes an edge extraction threshold value according to the magnification factor estimated by the magnification factor estimating means, such that the edge extraction threshold value is larger when the estimated magnification factor is larger and the edge extraction threshold value is smaller when the estimated magnification factor is smaller. Accordingly, the edge extraction threshold value can be changed according to the magnification factor. As a result, more accurate edge extraction is possible.

According to a seventh aspect of the present invention, provided is an edge calculation thinning apparatus comprising a pixel thinning means that changes a thinning factor for thinning pixels of a target image for detecting an edge amount according to the magnification factor estimated by the magnification factor estimating means, such that the thinning factor is larger when the estimated magnification factor is larger and the thinning factor is smaller when the estimated magnification factor is larger. Accordingly, the thinning factor can be changed according to the magnification factor. As a result, more accurate edge extraction is possible.

According to an eighth aspect of the present invention, provided is an edge calculation thinning apparatus comprising a compressing means that performs a compression process on the input image according to the magnification factor estimated by the magnification factor estimating means; an edge extracting means that extracts an edge from the compressed image; and a magnifying means that performs a magnification process on the image from which the edge is extracted, according to the magnification factor. Accordingly, suitable edge extraction can be performed even for a magnified image.

According to a ninth aspect of the present invention, provided is a magnification factor estimating method for estimating a magnification factor of an input image, comprising first calculation of calculating a prescribed high frequency component of the input image, as a first spatial frequency component characteristic value; second calculation of calculating a spatial frequency component of the input image, as a second spatial frequency component characteristic value; and estimation of calculating a ratio of the first spatial frequency component characteristic value to the second spatial frequency component characteristic value and estimating the magnification factor of the input image to be higher when the ratio is smaller. In this way, the image magnification factor can be determined to be smaller when the ratio of the high frequency component in the spatial frequency component of the input image is smaller.

According to a tenth aspect of the present invention, provided is a magnification factor estimating method in which the first spatial frequency component characteristic value and the second spatial frequency component characteristic value are obtained by calculating, for each pixel, a one-pixel difference value that is a total sum of absolute values of differences in pixel values between the pixel and prescribed surrounding pixels, and calculating the total sum of the one-pixel difference values. Accordingly, the amount of the high frequency components included can be obtained from the pixel differences of pixels surrounding the pixel of interest.

According to an eleventh aspect of the present invention, provided is a magnification factor estimating method in which the estimation includes calculating the magnification factor by subtracting 1 from the ratio. Accordingly, the magnification factor can be calculated.

According to a twelfth aspect of the present invention, provided is a magnification factor estimating method for estimating a magnification factor of an input image, comprising generating a high-frequency-removed image obtained by removing a prescribed high frequency component from the spatial frequency component of the input image, calculating a spatial frequency component of each pixel in the high-frequency-removed image as a single-pixel high-frequency-removed image frequency component characteristic value, calculating a spatial frequency component of each pixel in the input image as a single-pixel second spatial frequency component characteristic value, and calculating a difference between each single-pixel high-frequency-removed image frequency component characteristic value and single-pixel second spatial frequency component characteristic value as a single-pixel first spatial frequency component characteristic value; calculating a total sum of the single-pixel first spatial frequency component characteristic values of all of the pixels as a first spatial frequency component characteristic value and calculating a total sum of the single-pixel second spatial frequency component characteristic values for all of the pixels as a second spatial frequency component characteristic value; and calculating a ratio of the first spatial frequency component characteristic value to the second spatial frequency component characteristic value, and estimating the magnification factor of the input image to be higher when the ratio is smaller.

In this way, by removing a prescribed high frequency component from an input image and using the remaining high frequency component to estimate the magnification factor, the magnification factor can be easily and accurately estimated even from a magnified image.

In this Specification, the term "pixel value" obviously includes all numerical values for identifying image information, such as RGB values. In the embodiments, the term "one-direction increasing trend" refers to a trend of increasing in one direction, such as shown by the solid line in FIG. 6A. The term "one-direction decreasing trend" refers to a trend of decreasing in one direction, such as shown by the dashed line in FIG. 6A. However, these terms are not limited to these specific representations.

In the embodiments, the term "second spatial frequency component characteristic value" refers to a characteristic value specified from variance values of each pixel in the input image with respect to the surrounding pixels. Furthermore, the "first spatial frequency component characteristic value" refers to a characteristic value specified from the difference between the "second spatial frequency component characteristic value" and variance values of each pixel in a high-frequency-removed image with respect to the surrounding pixels, the high-frequency-removed image being obtained by removing a high frequency component from the input image. In the present embodiment, the "first spatial frequency component characteristic value" is calculated by obtaining each difference with respect to the "second spatial frequency component characteristic value" and calculating the total sum of these differences, but the present invention is not limited to this. Instead of obtaining the "first spatial frequency component characteristic value" according to the differences with respect to the "second spatial frequency component characteristic value," a high frequency component may be passed and the "first spatial frequency component characteristic value" may be obtained from the result.

The summary clause does not necessarily describe all necessary features of the embodiments of the present invention. The present invention may also be a sub-combination of the features described above.

BRIEF DESCRIPTION OF THE DRAWINGS

FIG. 4 shows a low-pass filter stored in the LPF storage section 26.

FIG. 16A is a filter used for edge detection in the present embodiment.

FIG. 16B is a filter used for edge detection in the present embodiment.

FIG. 19 shows a weighted mask.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

1.1 Function Blocks

Figure 1:
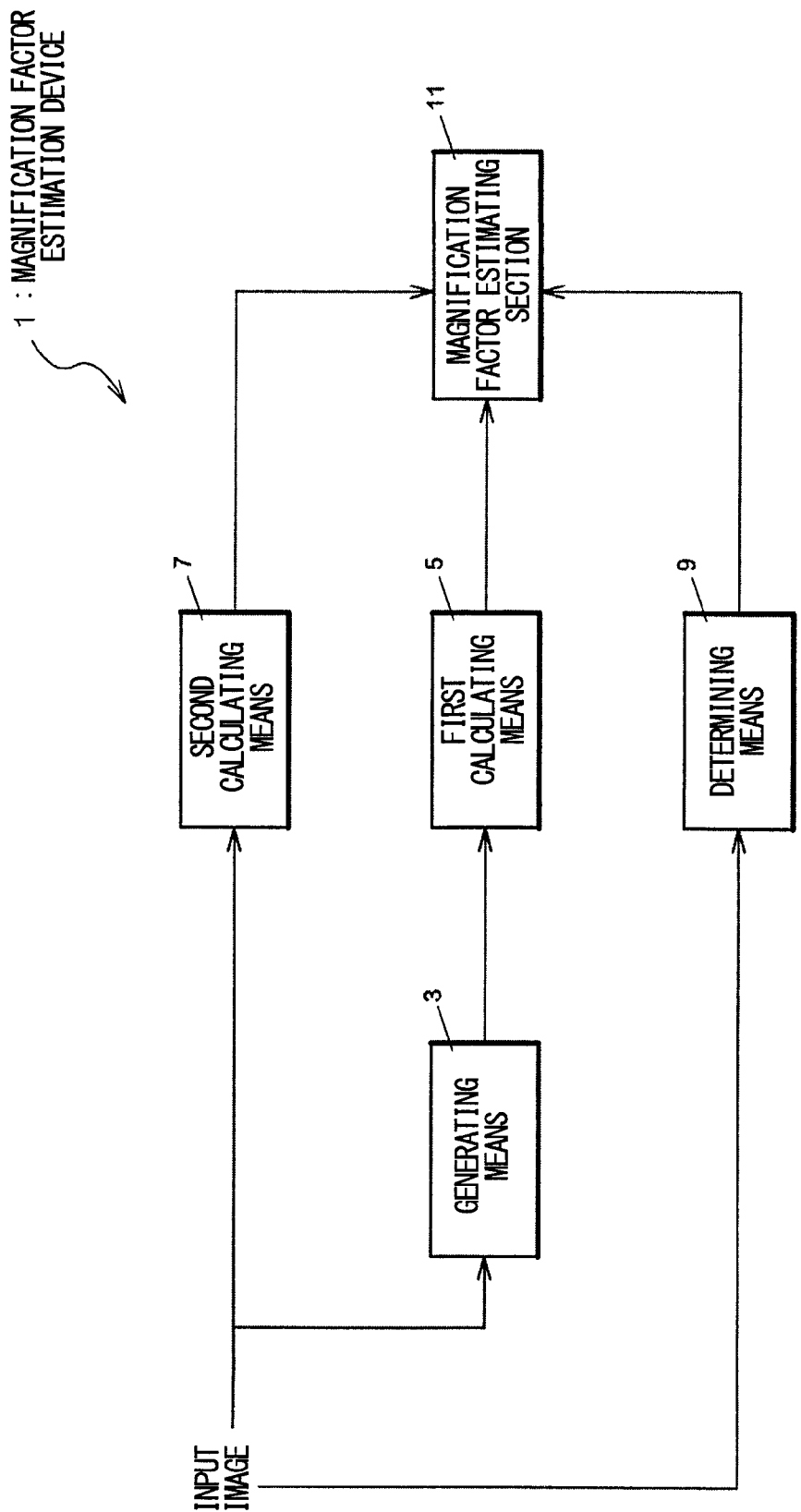
FIG. 1 shows function blocks of the magnification factor estimation device 1.

FIG. 1 shows function blocks of a magnification factor estimation device 1 according to a first embodiment of the present invention.

The magnification factor estimation device 1 estimates a magnification factor of an input image, and includes a generating means 3, a first calculating means 5, a second calculating means 7, a determining means 9, and a magnification factor estimating means 11.

The generating means 3 generates a high-frequency-removed image, which is obtained by removing a high frequency component of pixels positioned, with respect to a pixel of interest, in horizontal, vertical, and diagonal directions in a rectangular pixel region from the spatial frequency component of the input image, as a prescribed high frequency component of the input image.

The first calculating means 5 calculates the prescribed high frequency component of the input image as a first spatial frequency component characteristic value. The second calculating means 7 calculates the spatial frequency component of the input image as a second spatial frequency component characteristic value. The first and second spatial frequency component characteristic values are obtained by calculating, for each pixel, a one-pixel difference value that is the total sum of the absolute values of the differences between the pixel and prescribed surrounding pixels, and then calculating the total sum of the one-pixel difference values.

The determining means 9 determines whether there is block noise for each pixel. The magnification factor estimating means 11 removes the pixels that have been determined to be block noise by the determining means 9 from the total summation target pixels and, for the remaining pixels, estimates that the magnification factor of the input image is higher when the ratio of the first spatial frequency component characteristic value to the second spatial frequency component characteristic value is smaller.

1.2 Hardware Configuration

Figure 2:
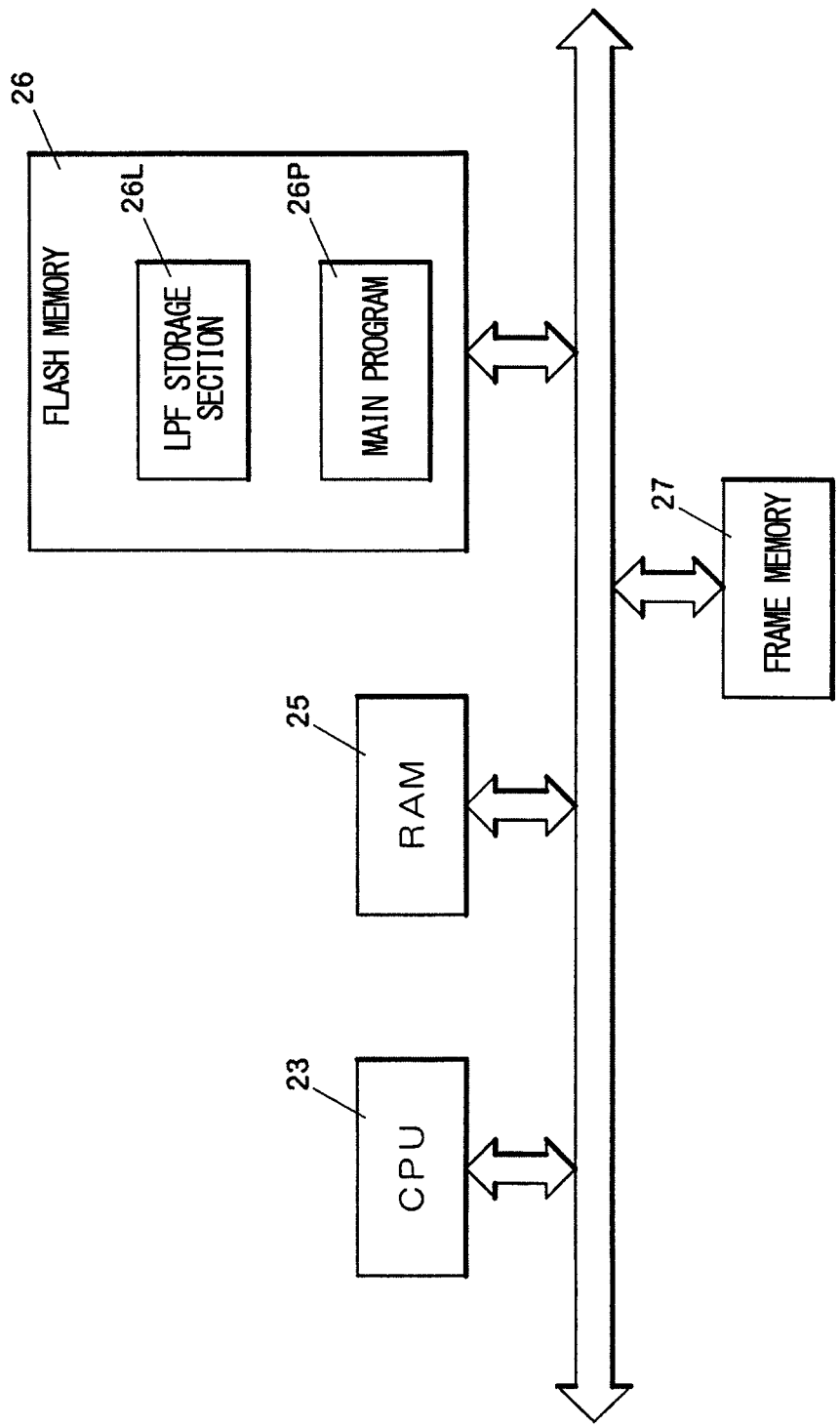
FIG. 2 shows an exemplary hardware configuration when the magnification factor estimation device 1 is configured using a CPU.
Figure 4:
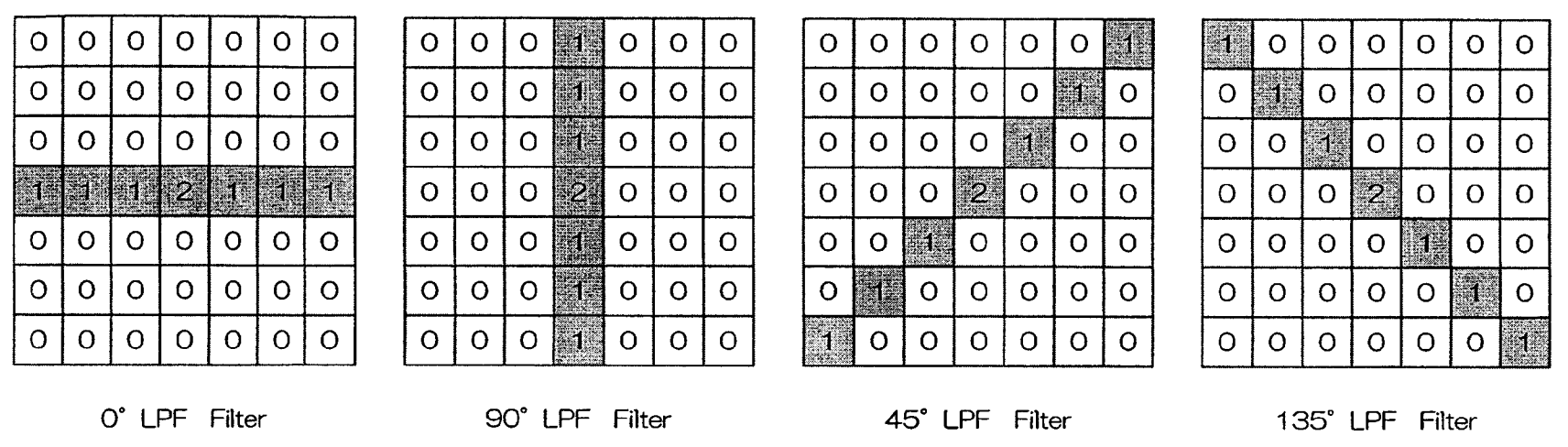

FIG. 2 shows a hardware configuration of the magnification factor estimation device 1. The magnification factor estimation device 1 includes a CPU 23, a RAM 25, and a flash memory 26. The flash memory 26 includes an LPF storage section 26L and a program 26P. The program 26P is used to perform processes such as magnification factor estimation and edge extraction, as described further below. The RAM 25 stores calculation results, for example. The frame memory 27 holds one screen of image data. Low-pass filters with four directions are stored in the LPF storage section 26, such as shown in FIG. 4. The CPU 23 performs magnification factor estimation and edge extraction on the image data stored in the frame memory 27, according to the program 26P.

1.3 Flow Chart Description

Figure 3:
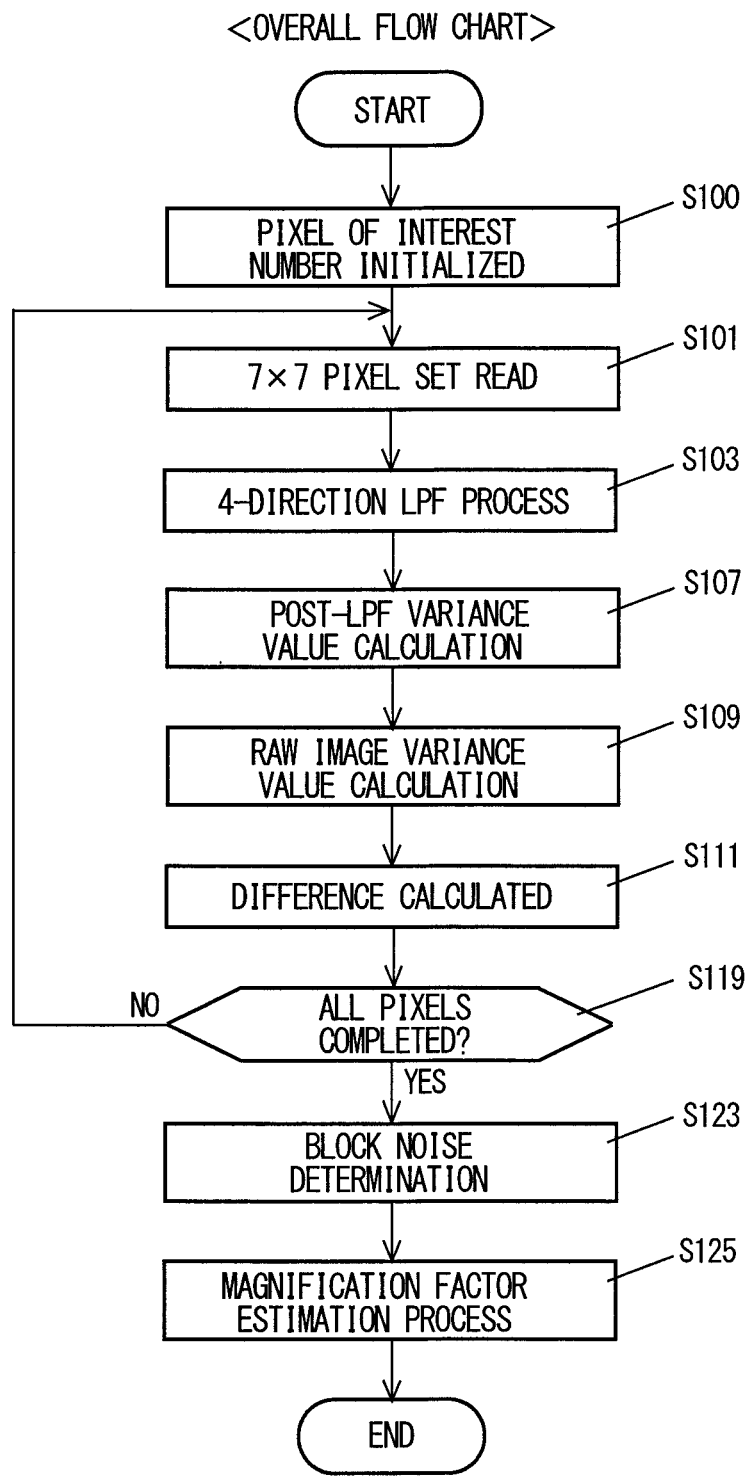
FIG. 3 is an overall flow chart.

FIG. 3 is used to describe the process performed using the program 26P shown in FIG. 2. The CPU 23 initializes the pixel of interest number q (step S100) and reads the pixel data of the block surrounding the q-th pixel (step S101). In the present embodiment, one block has 49 pixels in a 7×7 arrangement.

Figure 5:
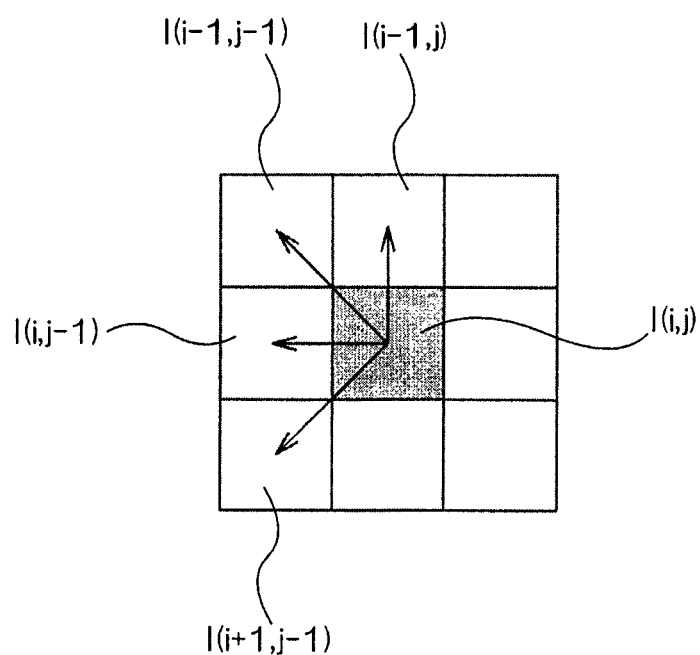
FIG. 5 shows adjacent pixels used for determining the difference.

The CPU 23 uses the four-direction LPF shown in FIG. 4 to remove a high frequency component from the pixel data of the one read block (step S103), and stores the results in a memory. The CPU 23 calculates the variance value in the pixel of interest number q (step S107). In the present embodiment, as shown in FIG. 5, the CPU 23 calculates the variance value of the pixel of interest I(i, j) by adding together the absolute values of the differences between the pixel of interest I(i, j) and each of four pixels adjacent thereto, which are the pixel I(i, j−1), the pixel I(i−1, j), the pixel I(i−1, j−1), and the pixel I(i+1, j+1). Here, the pixel I(i, j−1) is adjacent in the 0 degree direction of FIG. 4, the pixel I(i−1, j) is adjacent in the 90 degree direction of FIG. 4, the pixel I(i−1, j−1) is adjacent in the 135 degree direction of FIG. 4, and the pixel I(i+1, j+1) is adjacent in the 45 degree direction of FIG. 4.

The CPU 23 calculates the variance value of the pixel of interest number q in the same manner for the raw image stored at step S101 of FIG. 3 (step S109). The calculation method is the same as used in step S107, and therefore the description is omitted.

The CPU 23 calculates the absolute value of the difference between the variance value of the raw image calculated at step S109 and the variance value after the high frequency component has been removed, which is calculated at step S107 (step S111). In this way, the remaining high frequency component is obtained for each pixel.

The CPU 23 determines whether the difference calculation has been completed for all of the pixels (step S119), and repeats the processes from step S101 to step S111. In this way, the variance value between the image that has undergone the LPF process and the raw image is obtained for all of the pixels in one frame.

Figure 6B:
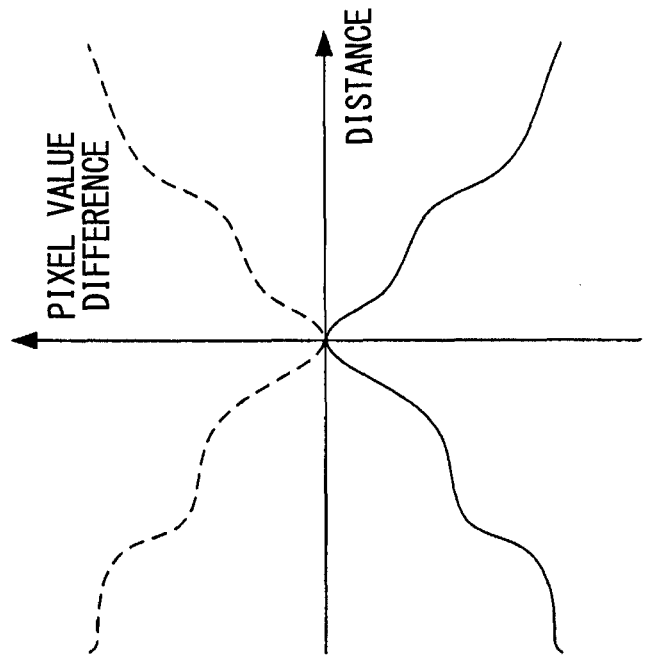
FIG. 6B shows an edge trend.
Figure 6A:
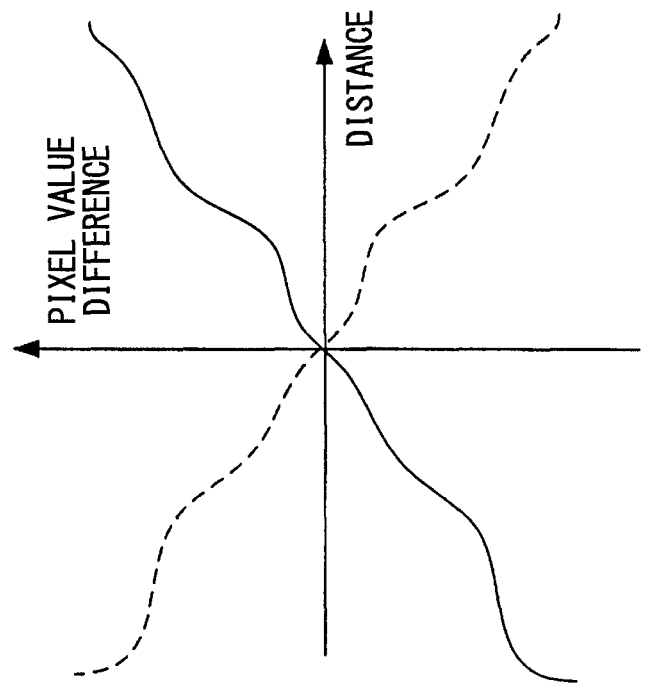
FIG. 6A shows a block noise trend.

The CPU 23 performs a block noise determination (step S123). In the present embodiment, the block noise characteristic is focused on, and this determination is made for each pixel. FIG. 6A shows the relationship between the difference of a pixel value and the distance from the corresponding pixel, in a case where the pixel is block noise. FIG. 6B shows the relationship between the difference of a pixel value and the distance from the corresponding pixel, in a case where the pixel is an edge. In the present embodiment, in a case where a pixel is an edge, the trend of the pixel difference value changes with this pixel as a peak, and in a case where a pixel is block noise, the trend of the pixel difference value is to decrease in one direction or increase in one direction.

In the present embodiment, block noise pixels are removed from the calculation targets by detecting a related block noise characteristic. The block noise detection process is described using FIG. 7. The CPU 23 initializes the pixel of interest number q (step S200 of FIG. 7). The CPU 23 performs a block noise amount calculation in the horizontal direction (step S203). Step S203 is described in detail using FIG. 8.

The CPU 23 initializes the processing target pixel number h(i). In the present embodiment, the processing targets are the −8th to +8th pixels, and therefore the initialization results in h(i)=−8. The CPU 23 reads the pixel value of the pixel of interest q and the pixel value of the pixel that is at the −8th position in the horizontal direction from the pixel of interest q. The relationship between these pixels is shown in FIG. 9. The CPU 23 subtracts the pixel value of the pixel positioned at the processing target pixel number h(i) from the pixel value of the target pixel q (step S225 of FIG. 8). If the difference is greater than a threshold value Hth, a horizontal flag of the pixel with the processing target pixel number h(i) is set to 1. On the other hand, if the difference is not greater than the threshold value Hth, a determination is made as to whether the difference is less than a threshold value −Hth (step S231).

If the difference is less than the threshold value −Hth, the horizontal flag of the pixel with the processing target pixel number h(i) is set to −1. If the difference is not less than the threshold value −Hth, the horizontal flag of the pixel with the processing target pixel number h(i) is set to 0.

The CPU 23 determines whether the processing target pixel number h(i) is greater than 8 (step S237). If the processing target pixel number h(i) is not greater than 8, the CPU 23 increments the processing target pixel number h(i) and repeats the steps from S223 and onward.

In this way, as shown in FIG. 9, the relationship between the target pixel and the pixels positioned within 8 pixels to the left and right is obtained.

Figure 8:
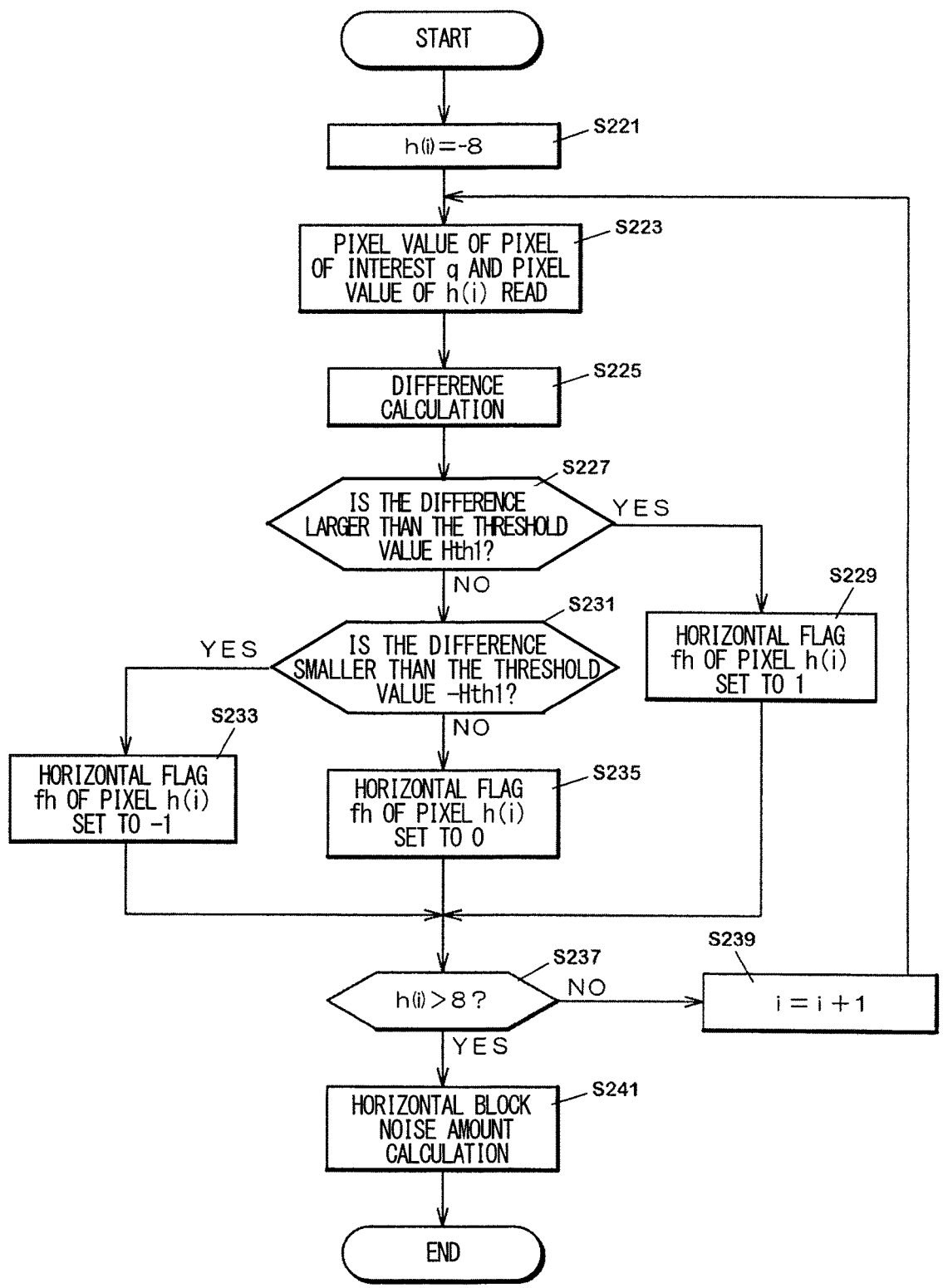
FIG. 8 is a flow chart for the process of calculating the horizontal block noise amount.
Figure 9:
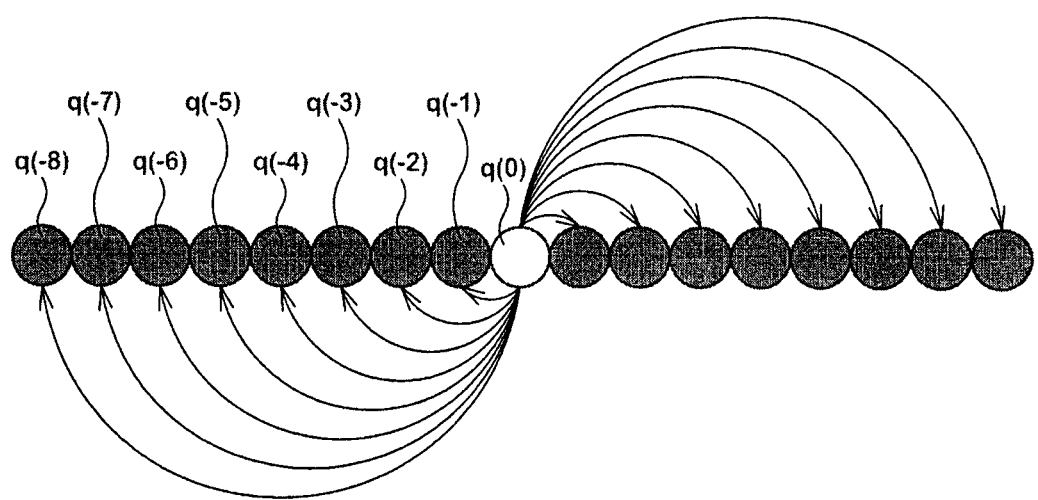
FIG. 9 shows the relationship between the pixels used in calculating the horizontal block noise amount.

At step S237 in FIG. 8, if the processing target pixel number h(i) is greater than 8, the horizontal flags for all target pixels are acquired, and therefore the block noise amount in the horizontal direction for the pixel of interest q is calculated (step S241). In the present embodiment, the block noise amount in the horizontal direction is a value calculated by adding together the horizontal flags of the 16 pixels calculated through the calculation described above.

Figure 10:
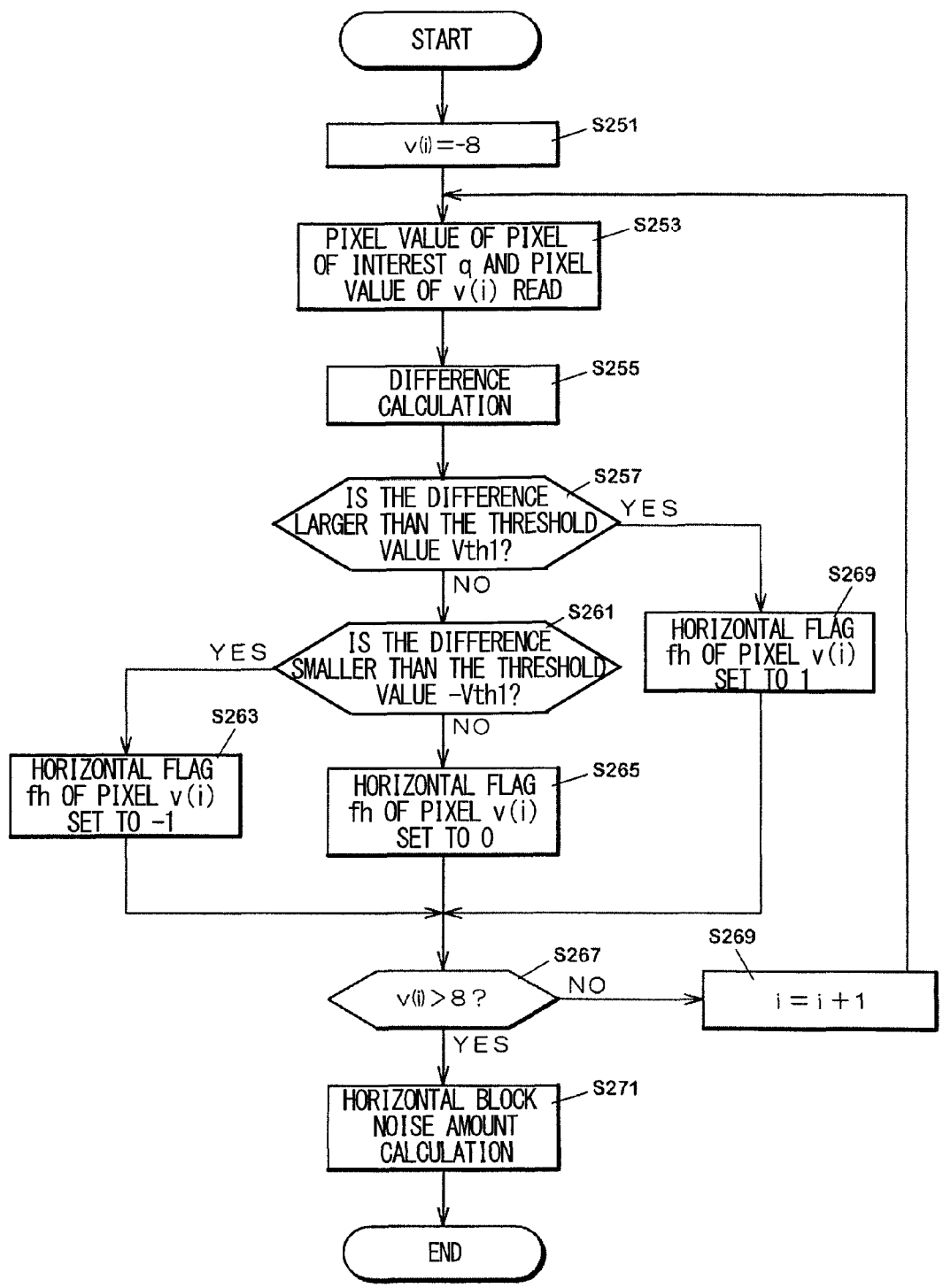
FIG. 10 is a flow chart for the process of calculating the vertical block noise amount.

The CPU 23 calculates the block noise amount in the vertical direction (step S205). Step S205 is described in detail using FIG. 10. The processes of step S251 to step S271 in FIG. 10 are the same as those described in FIG. 8, except that the direction is changed from the horizontal direction to the vertical direction, and therefore the description is omitted.

Figure 7:
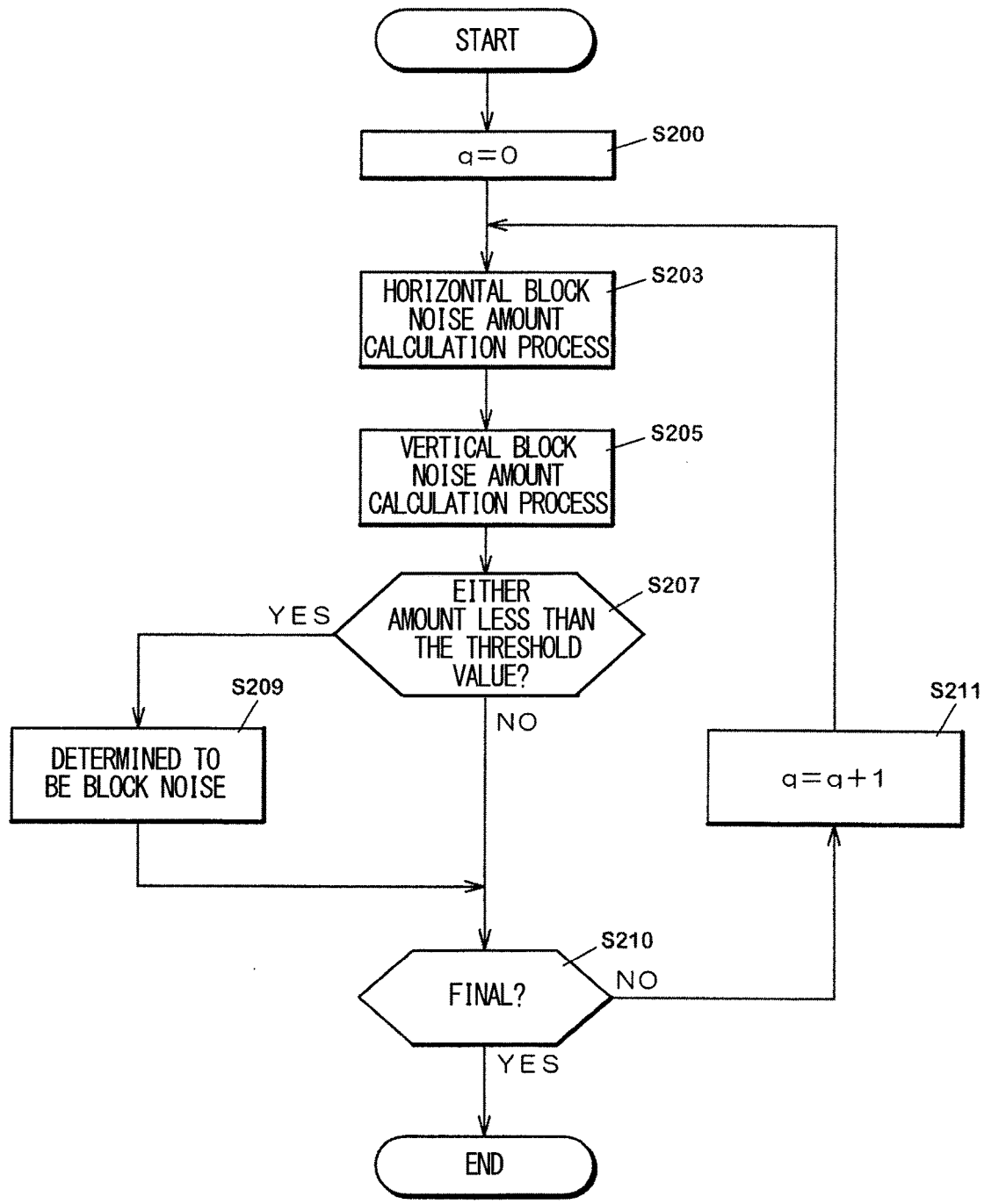
FIG. 7 is a flow chart for the block noise removal process.

The CPU 23 determines block noise pixels (steps S207 and S209 of FIG. 7). In the present embodiment, a pixel is determined to be block noise if the horizontal block noise amount is less than a threshold value THh or if the vertical block noise amount is less than a threshold value THv.

The following describes the standards for this determination. As described above in FIG. 6A, when the pixel of interest is block noise, the difference value for this pixel of interest exhibits a one-direction increasing trend or a one-direction decreasing trend as the distance from the pixel of interest increases. In this case, the flags calculated at steps S203 and S205 include a flag with a value of 1 and a flag with a value of −1 sandwiching the pixel of interest. Accordingly, in this case, the block noise amount is smaller. On the other hand, as shown in FIG. 6B, in a case where the increasing trend and the decreasing trend switch at the pixel of interest, the pixel of interest is sandwiched by almost entirely flags with a value of 1 or almost entirely flags with a value of −1. Accordingly, in this case, the block noise amount is larger. Accordingly, the block noise amount is less than the threshold value. In other words, in a case where the horizontal block noise amount is less than the threshold value THh or in a case where the vertical block noise amount is less than the threshold value THv, it can be determined that there is block noise.

The CPU 23 determines whether the final pixel has been reached (step S210), and if the final pixel has not been reached, increments the pixel of interest number q (step S211) and repeats the steps from step S203 and onward.

In this way, the determination as to whether a pixel is a block noise pixel can be made in pixel units.

Figure 11:
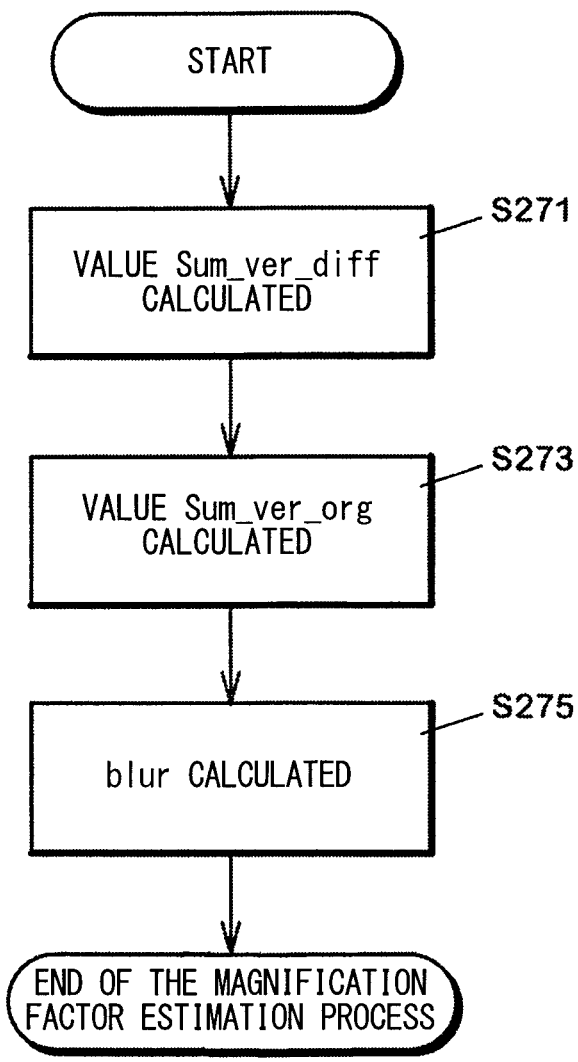
FIG. 11 is a flow chart for the magnification factor estimation process.

The CPU 23 performs the magnification factor estimation process (step S125 of FIG. 3). The magnification factor estimation of the present embodiment is described using FIG. 11. The CPU 23 calculates the value Sum_ver_diff that is the sum of the differences calculated at step S111 of FIG. 3 for all of the pixels of one frame, excluding the pixels that have been determined to be block noise pixels at step S123 (step S271 of FIG. 11). The CPU 23 calculates the value Sum_ver_org that is the sum of the variance values of the original image calculated at step S109 of FIG. 3 for all of the pixels of the one frame, excluding the pixels that have been determined to be block noise pixels at step S123 (step S273 of FIG. 11). The CPU 23 calculates the normalized magnification estimation factor "blur" using the expression shown below.

$$\text{blur}=1-(\text{Sum\_ver\_diff}/\text{Sum\_ver\_org})$$

In this way, by determining the block noise and not aggregating the variation differences of the image determined to be block noise, it is possible to accurately estimate the magnification factor without being affected by block noise. In particular, when an image is compressed and then subjected to a low-precision magnification technique such as a bilinear technique, the block noise generated during the compression is more noticeable, and the present invention is effective in this case.

In the present embodiment, the block noise is determined in the horizontal direction and the vertical direction, and this is because the block noise frequently appears in the horizontal or vertical direction.

In the present embodiment, the block noise determination is made in units of one pixel, but when there is block noise it frequently continues in the horizontal or vertical direction. Accordingly, a step may be provided to determine whether the block noise is continuous over a certain number of pixels or more, and if the block noise is continuous for at least the prescribed number of pixels, it may be determined that these are block noise pixels.

Figure 12:
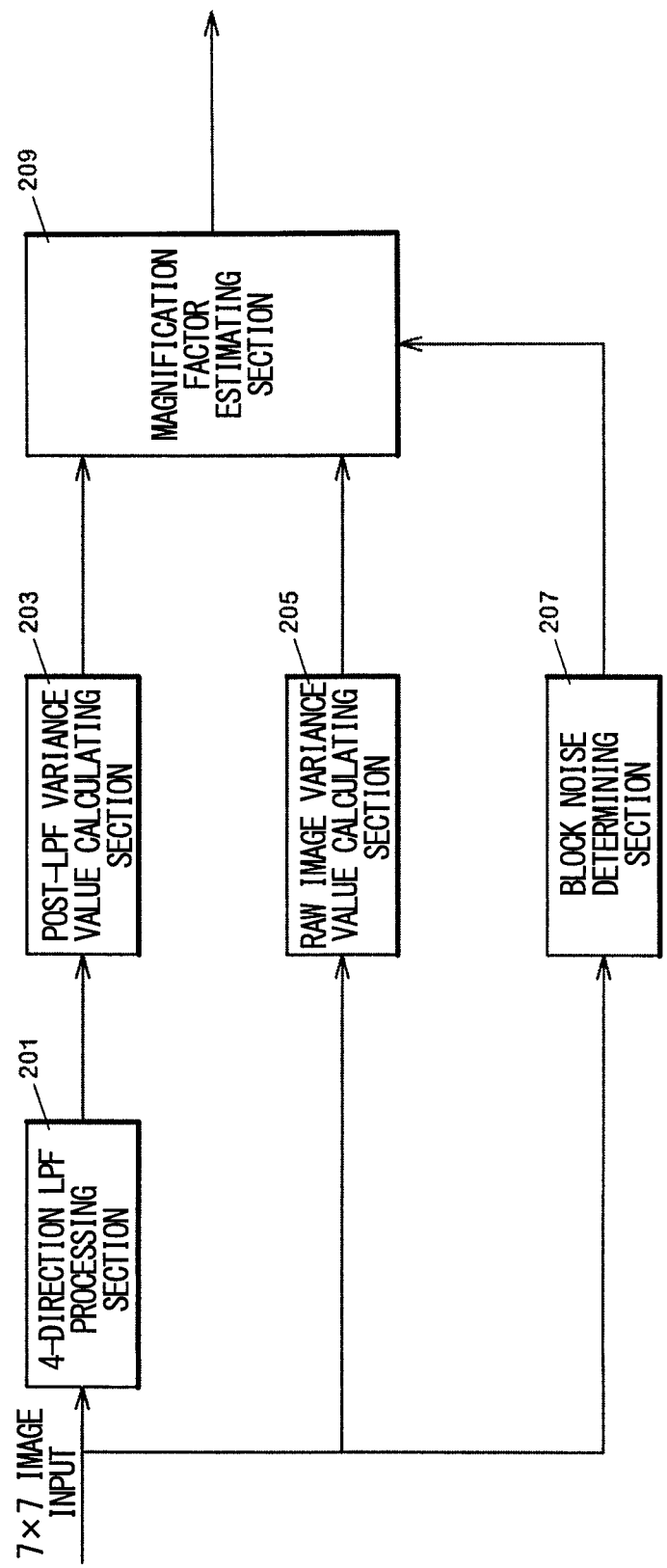
FIG. 12 shows the basics of the magnification factor estimation device 1 when realized by hardware.

FIG. 12 is a block diagram of a case in which the magnification factor estimation device 1 described above is realized by hardware. A 7×7 image is supplied to the four-direction LPF 201, the raw image variance value calculating section 205, and the block noise determining section 207. The four-direction LPF 201 removes the prescribed high frequency component, and the post-LPF variance value calculating section 203 calculates the variance value for each pixel in the 7×7 arrangement with respect to the remaining high frequency component. The raw image variance value calculating section 205 also calculates the variance value for each pixel in the 7×7 arrangement. The block noise determining section 207 performs the block noise determination using the 7×7 pixel arrangement. In the present embodiment, the block noise determination is performed using 16 surrounding pixels, and therefore the 7×7 image is insufficient. Accordingly, the block noise determining section 207 acquires the pixel values of the pixels in surrounding blocks and stores these values. The magnification factor estimating section 209 performs the magnification factor estimation as described above, using the data supplied to the four-direction LPF 201, the raw image variance value calculating section 205, and the block noise determining section 207.

By combining the magnification factor estimation device 1 described above with a conventional edge enhancement processing apparatus, it is possible to perform an edge enhancement process, for example. In particular, by using the estimated magnification factor to calculate the optimal edge extraction threshold value, it is possible to perform edge extraction corresponding to the magnification factor.

Figure 13:
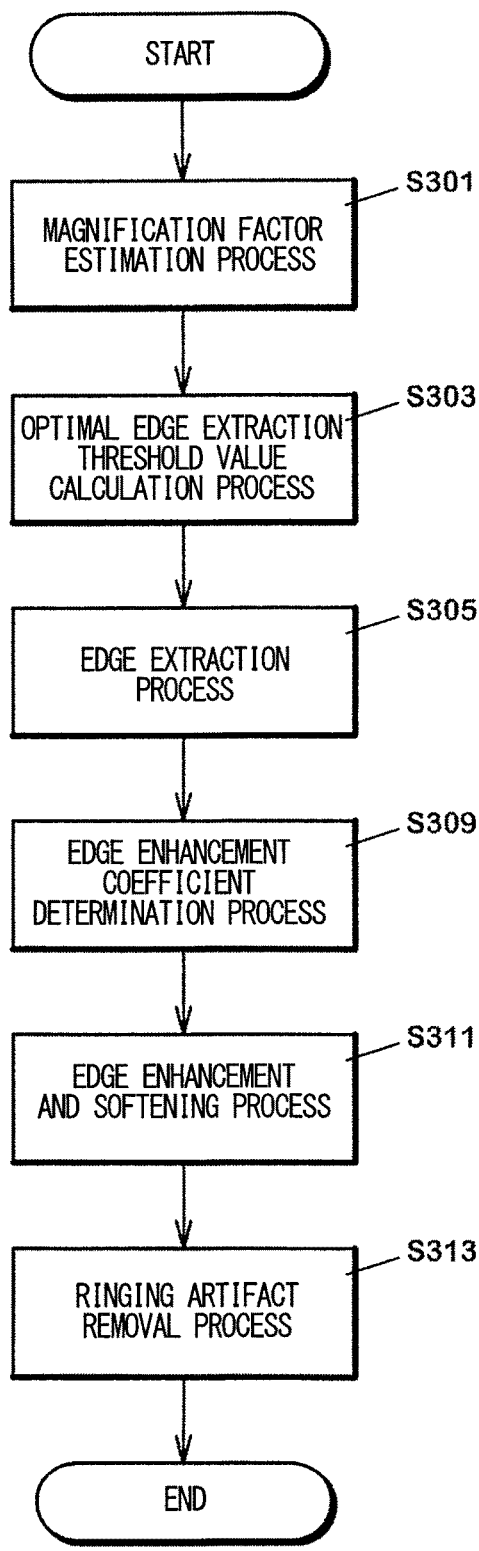
FIG. 13 is a flow chart of the process performed when edge enhancement is realized using the magnification factor estimation device 1.

The hardware configuration in this case is the same as shown in FIG. 2, and therefore the description is omitted. FIG. 13 is a flow chart of an edge enhancement process.

Figure 14:
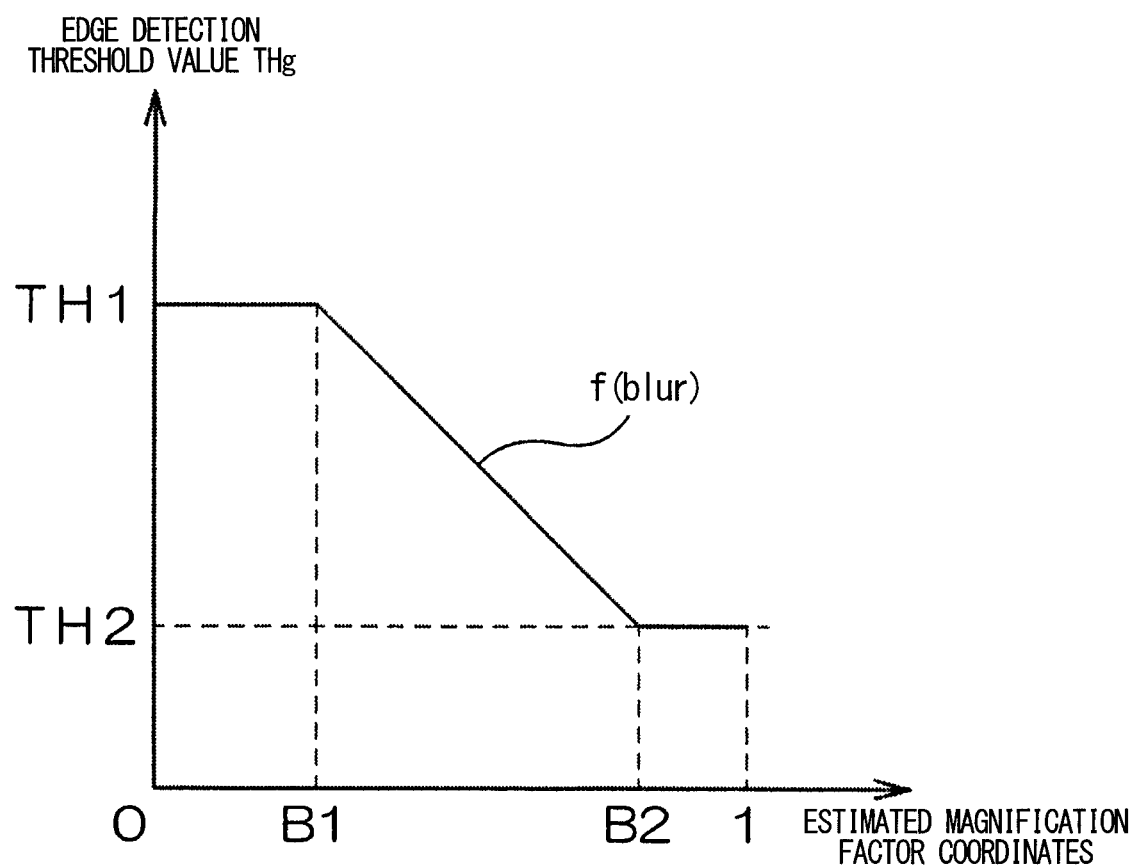
FIG. 14 shows a graph for determining the edge detection threshold value.

The CPU 23 performs the magnification factor estimation process (step S301 of FIG. 13). This process is the process for calculating the normalized magnification estimation factor "blur" performed by the magnification factor estimation device 1 described above. The CPU 23 calculates the optimal edge extraction threshold value THb based on the normalized magnification estimation factor "blur" (step S303). This involves plugging the calculated normalized magnification estimation factor "blur" into the graph shown in FIG. 14 to determine the edge extraction threshold value THb. Specifically, when the normalized magnification estimation factor "blur" is less than a value B1 corresponding to the upper threshold value TH1, the upper threshold value TH1 is set as the edge extraction threshold value THb. Furthermore, when the normalized magnification estimation factor "blur" is greater than a value B2 corresponding to the lower threshold value TH2, the lower threshold value TH2 is set as the edge extraction value THb. When the normalized magnification estimation factor "blur" is between the value B1 corresponding to the upper threshold value TH1 and the value B2 corresponding to the lower threshold value TH2, the edge extraction threshold value THb is determined based on the function f(blur) shown in FIG. 14. In this way, a small edge extraction threshold value TH is obtained when the estimated magnification factor is large, and a large edge extraction threshold value TH is obtained when the estimated magnification factor is small.

In the present embodiment, an upper threshold value and a lower threshold value are provided, and these are set as desired.

Figure 15:
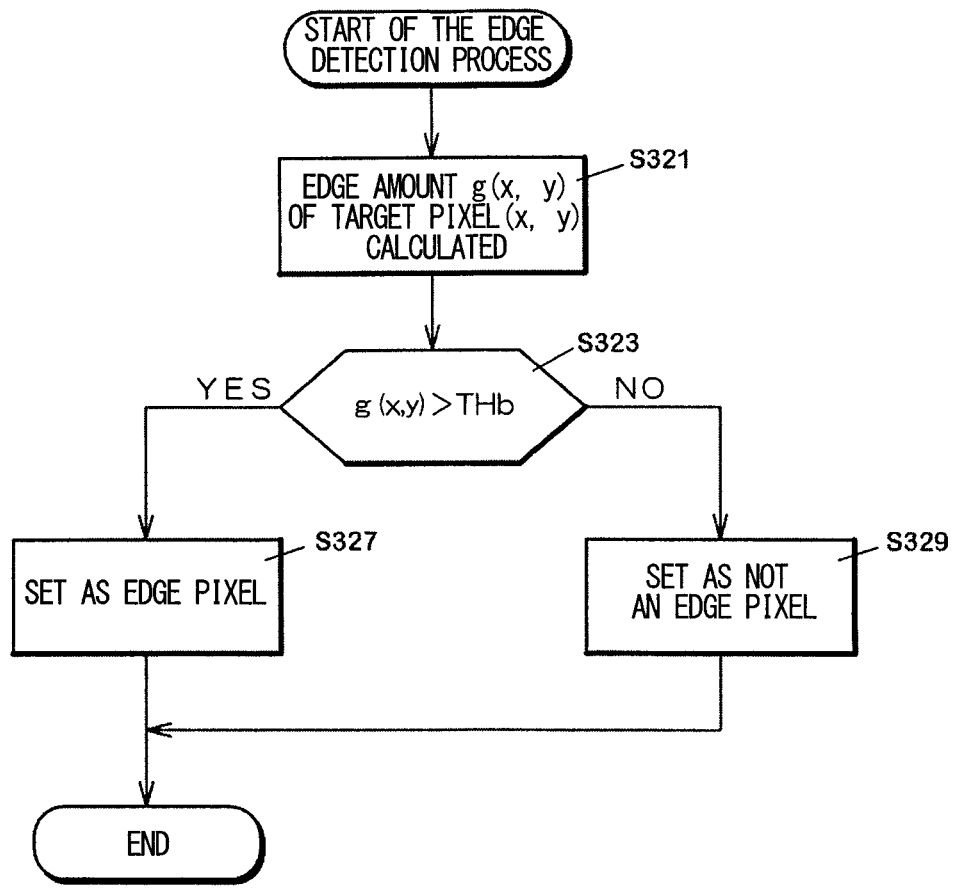
FIG. 15 is a detailed flow chart for edge detection.
Figures 16A, 16B:
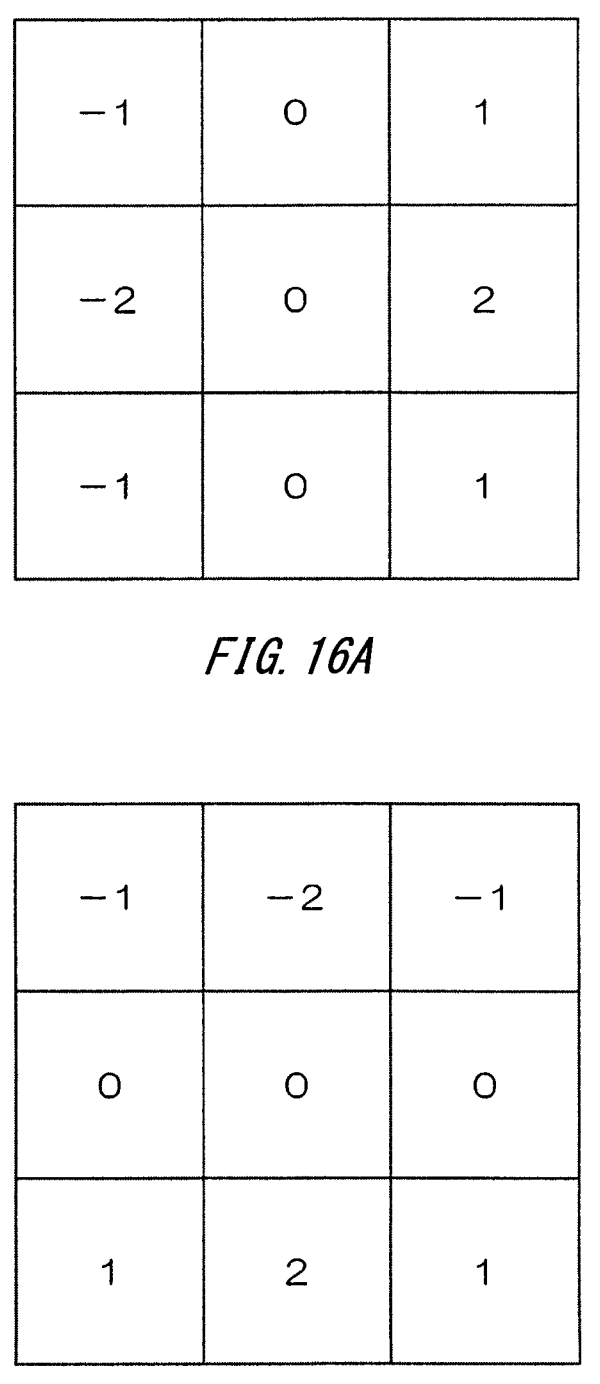

The edge extraction process is described using FIG. 15. The CPU 23 calculates the edge amount g(x, y) of the edge amount calculation target pixel (x, y) (step S321). In the present embodiment, the edge amount g(x, y) of the edge amount calculation target pixel (x, y) is calculated by using a Sobel filter and adding together total values obtained in the horizontal direction and the vertical direction. In other words, a calculation is performed using the coefficient matrix of the vertical direction and the horizontal direction shown in FIGS. 16A and 16B to calculate the absolute value of the total value gHS in the horizontal direction and the absolute value of the total value gVS in the vertical direction, and these two absolute values are added together. In this way, the calculation is simplified because the edge amount is calculated using the absolute values of the total value gHS and the total value gVS in the vertical direction, without performing a square function operation.

The CPU 23 determines whether the edge amount g(x, y) of the edge amount calculation target pixel (x, y) exceeds the threshold value THb calculated at step S303 of FIG. 13 (step S323), determines that the edge amount calculation target pixel (x, y) is an edge (step S327) if the edge amount g(x, y) of the edge amount calculation target pixel (x, y) exceeds the threshold value THb, and determines that the edge amount calculation target pixel (x, y) is not an edge (step S329) if the edge amount g(x, y) of the edge amount calculation target pixel (x, y) does not exceed the threshold value THb. The CPU 23 performs this edge determination for all of the pixels. The edge extraction may be performed using a method other than the method described above.

Next, the CPU 23 determines the edge enhancement coefficient for each pixel of interest based on the distribution of the edges extracted at step S305 (step S309 of FIG. 13).

Figure 17:
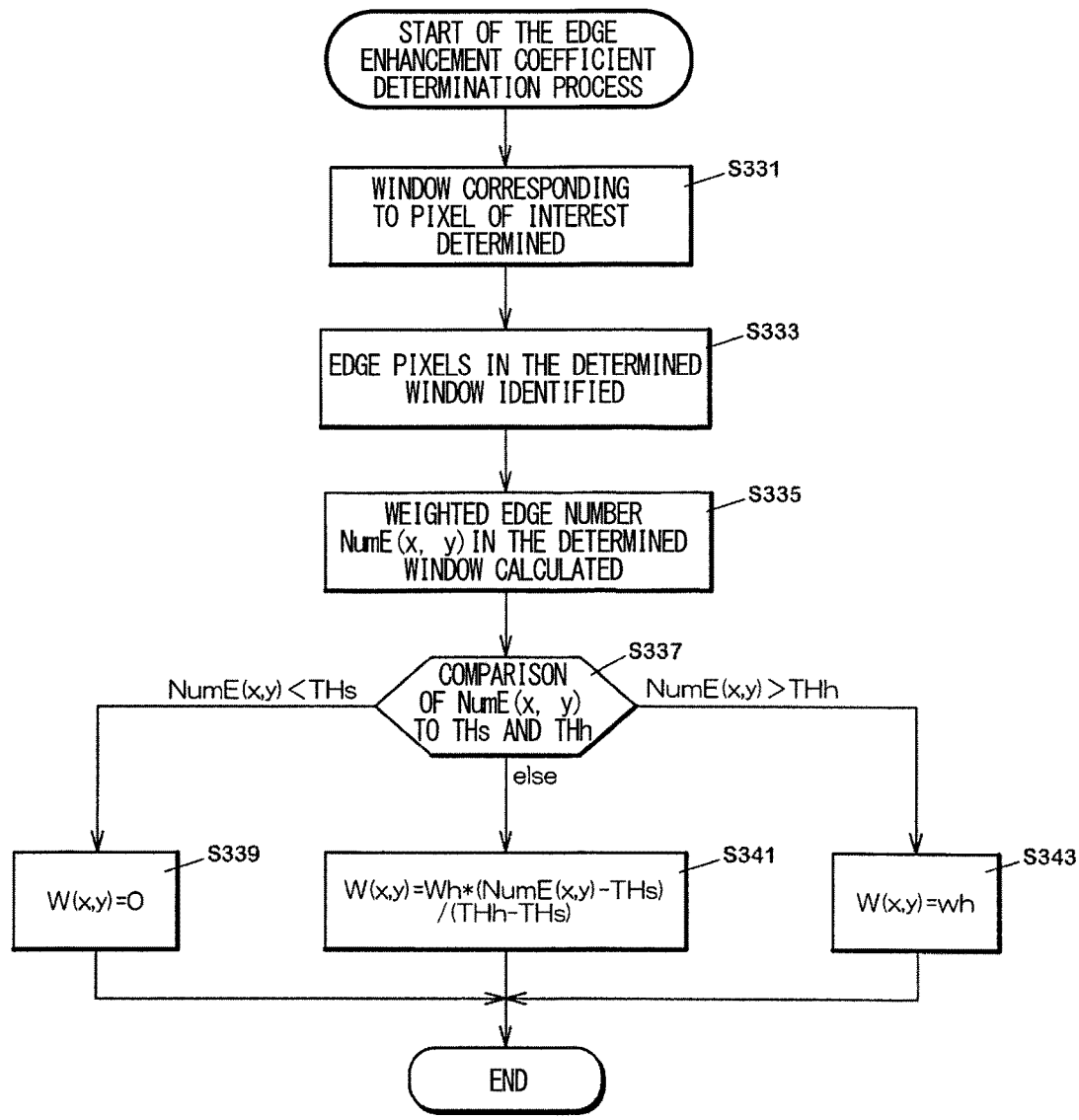
FIG. 17 is a detailed flow chart for determining the edge enhancement process coefficient.
Figure 18:
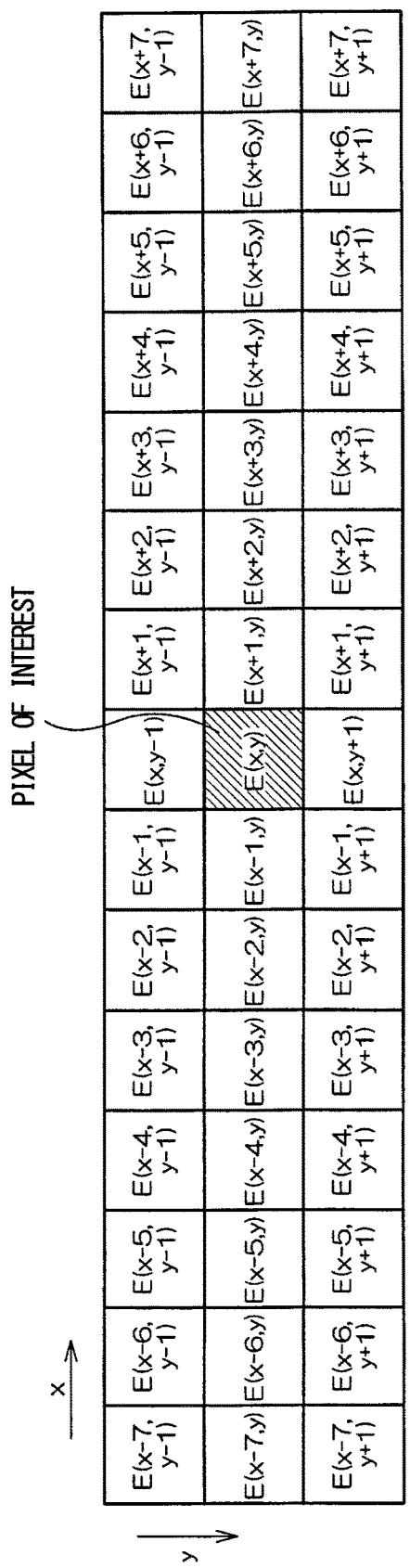
FIG. 18 shows a 15×3 window used in the present embodiment.

The edge enhancement coefficient process for a pixel of interest is described using FIG. 17. The CPU 23 determines a window for the pixel of interest (step S331 of FIG. 17). In the present embodiment, a range of pixels in a 15×3 arrangement with the pixel of interest at the center, such as shown in FIG. 18, is set as the window. In this way, the distribution of edges positioned within the window centered on the pixel of interest is obtained.

The CPU 23 identifies the edge pixels in the determined window (step S333). The CPU 23 uses the filter shown in FIG. 18 to calculate a weighted total edge value NumE(x, y) indicating how many edge pixels are present at positions near the pixel of interest in the window range (step S335). In the present embodiment, the weighted total edge value NumE(x, y) is obtained by, for the pixels in the region surrounding the pixel of interest, setting a value of 1 for pixels that are edge pixels, setting a value of 0 for pixels that are not edge pixels, applying the resulting values to filter shown in FIG. 19, and totaling the results.

The CPU 23 compares the obtained weighted total edge value NumE(x, y) to a predetermined lower threshold value THs and a predetermined upper threshold value THh (step S337). If the weighted total edge value NumE(x, y) is less than the lower threshold value THs, the edge enhancement coefficient W(x, y) is set to 0 (step S339). If the weighted total edge value NumE(x, y) is greater than the upper threshold value THh, the edge enhancement coefficient W(x, y) is set to a predetermined maximum coefficient value Wh (step S343). Furthermore, if the weighted total edge value NumE(x, y) is between the lower threshold value THs and the upper threshold value THh, the edge enhancement coefficient W(x, y) is calculated using the expression shown below (step S341).

$$W(x,y)=Wh*(NumE(x,y)-THs)/(THh-THs)$$

Figure 20:
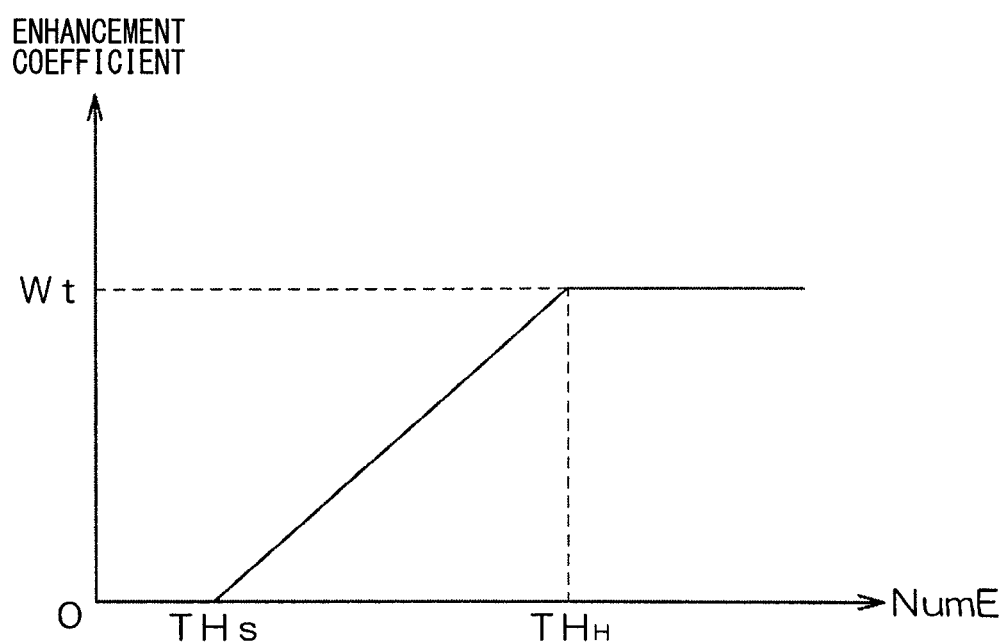
FIG. 20 is a graph showing the relationship between the enhancement coefficient and the weighted edge summation value.

In this way, the relationship between the weighted total edge value NumE(x, y) and the edge enhancement coefficient W(x, y) is linear between the lower threshold value THs and the upper threshold value THh, the edge enhancement coefficient W(x, y) is zero when the weighted total edge value NumE(x, y) is less than the lower threshold value THs, and the edge enhancement coefficient W(x, y) is the maximum coefficient value Wh when the weighted total edge value NumE(x, y) is greater than the upper threshold value THh, as shown in FIG. 20.

Accordingly, the enhancement coefficient W(x, y) for the texture and edge portions is determined linearly without enhancing the flat portions. Therefore, the texture portions can be more strongly enhanced. Furthermore, by providing a maximum limit, over-enhancement of portions that might be over-enhanced is prevented, thereby decreasing the ringing artifacts.

The CPU 23 performs the above processes on all of the pixels.

Next, the CPU 23 performs an edge enhancement and softening process on the pixel of interest (step S311 of FIG. 13), and performs a ringing artifact removal process. The edge enhancement process and the ringing artifact removal process may be performed using conventional techniques.

In this way, the edge enhancement process is completed.

In the present embodiment, the edge extraction threshold value is calculated from the estimated magnification factor, but the pixel thinning factor may be increased when the estimated magnification factor is larger and the pixel thinning factor may be decreased when the estimated magnification factor is smaller. This is because a large magnification factor means that a pixel in the raw image is expressed by a plurality of pixels, and therefore a suitable edge amount can be detected by thinning by a corresponding amount.

Figure 21:
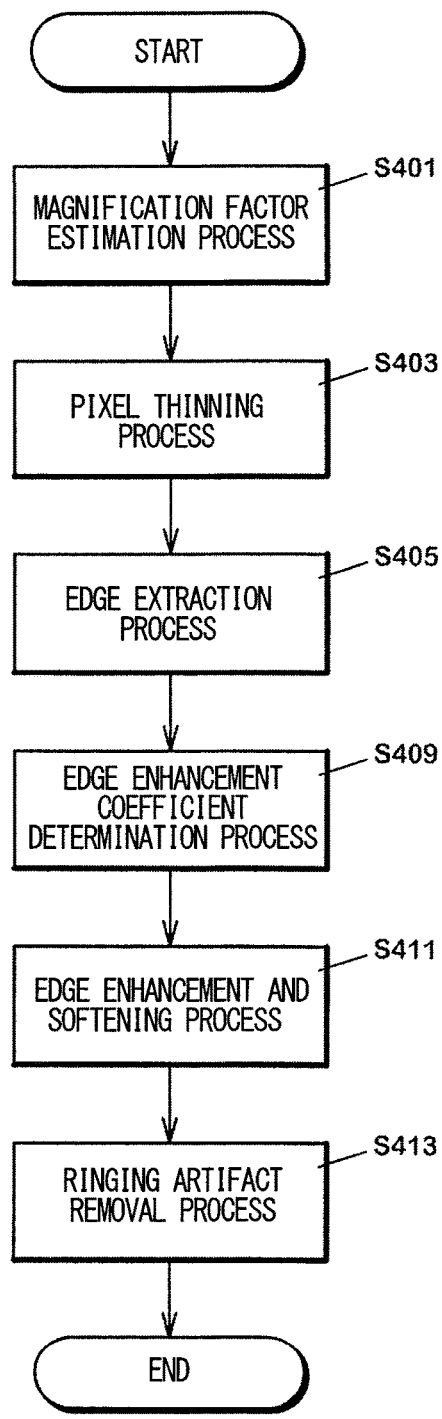
FIG. 21 is a flow chart used when performing the pixel thinning process.
Figure 22A:
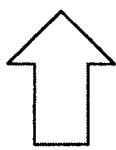
FIG. 22A shows an exemplary conventional filter used for the pixel thinning process.
Figure 22B:
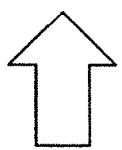
FIG. 22B shows an exemplary filter of the present embodiment used for the pixel thinning process.

FIG. 21 is a flow chart showing a process performed in this case. Steps S401 and S405 to S413 are respectively the same as steps S301 and S305 to S313. In step S403, the pixel thinning process is performed using a Laplacian filter with a changing thinning factor, based on the magnification factor estimated at step S401. FIG. 22A shows a conventional Laplacian filter. On the other hand, the Laplacian filter shown in FIG. 22B has greater thinning in the vertical direction and the horizontal direction. At step S405, edge extraction is performed on the image that has undergone the thinning process.

In this way, in the present embodiment, the edge enhancement process is changed based on the estimated magnification factor. The edge enhancement process can be changed dynamically by dynamically detecting the magnification factor.

There are cases where the magnification factor is a decimal. In such a case, instead of performing thinning, after detecting the edges from an image obtained by compressing the input image, the edge detection screen may be magnified to the original size. For example, when the magnification factor is estimated to be 1.3, at step S403 of FIG. 21, the input image is magnified by 1/1.3 and edge extraction is performed, after which this screen may be magnified by 1.3 before the edge enhancement process (step S411) is performed.

2. Other Embodiments

In the present embodiment, four surrounding pixels are used to calculate the difference between the pixel of interest and the surrounding pixels, but the present invention is not limited to this, and other calculation standards such as general variance or amount of deviation can be adopted.

The present embodiment uses a simple four-direction low-pass filter, but any device may be used as long as the device can remove a high frequency component, and a general low-pass filter may be used. Furthermore, the size of the LPF is not limited.

In the present embodiment, the magnification factor estimation is performed for one frame, but the same determination can be performed for a region that is a portion of one frame.

In the present embodiment, the block noise determination involves determining the block noise amount in the flow charts of FIGS. 8 and 10, but the present invention is not limited to this and, as an example, instead of performing determinations continuously on pixels in the horizontal direction, a portion of the pixels may be extracted or the determination may be made for only an end portion.

In the present embodiment described above, in order to realize the functions shown in FIG. 1, software is used via the CPU 23. However, some or all of the functions may be realized by hardware such as logic circuits. Some of the processes of the program may be performed by an operating system (OS).

The 15×3 pixel arrangement set for the window shown in FIG. 18 is a good size when considering cost performance in relation to the necessary line memory, but the present invention is not limited to this.

In the present embodiment, a Sobel filter is used for the edge detection process, but another filter such as a Prewitt filter may be used for the edge detection process.

The invention described through the above embodiments can be understood as being a block noise determination apparatus, such as described below.

A block noise pixel determination apparatus for determining pixels that are block noise from among pixels forming an image formed by a plurality of pixels includes a means for extracting pixel values of a pixel of interest that is a determination target and surrounding pixels, a means for calculating a difference among the extracted pixel values, and a determining means that determines the pixel of interest to be a block noise pixel when it is determined that a trend of the differences with respect to the surrounding pixels is a one-direction increasing trend or a one-direction decreasing trend.

Furthermore, the block noise pixel determination apparatus may include a means for removing the pixels determined to be block noise by the determining means from the pixels that are targets in the total summation.

Furthermore, the determining means may include a difference value calculating means that calculates differences between a pixel value of the pixel of interest and pixel values of a prescribed number of pixels in a left and right direction sandwiching the pixel of interest and a prescribed number of pixels in an up and down direction sandwiching the pixel of interest, and a block noise pixel determining means that determines the pixel of interest to be block noise when a trend of the calculated difference values is a one-direction increasing trend or a one-direction decreasing trend in both the left and right direction and the up and down direction.

The invention disclosed in the above embodiments can be understood as being the edge extraction threshold value calculation apparatus described below.

An edge extraction threshold value calculation apparatus that changes the edge extraction threshold value when supplied with an estimated magnification factor for a supplied image includes an edge extraction threshold value changing means that changes the edge extraction threshold value to be larger when the estimated magnification factor is larger and changes the edge extraction threshold value to be smaller when the estimated magnification factor is smaller.

The invention disclosed in the above embodiments can be understood as being the edge calculation thinning apparatus described below.

An edge calculation thinning apparatus that changes the thinning factor used to thin pixels of a target image for detecting an edge amount according to the magnification factor estimated by the magnification factor estimating means includes a pixel thinning means that changes the thinning factor to be larger when the estimated magnification factor is larger and changes the thinning factor to be smaller when the estimated magnification factor is larger.

The invention disclosed in the above embodiments can be understood as being the edge extraction apparatus described below.

The edge extraction apparatus includes a compressing means that performs a compression process on the input image according to the magnification factor estimated by the magnification factor estimating means, an edge extracting means that extracts an edge from the compressed image; and a magnifying means that performs a magnification process on the image from which the edge is extracted, according to the magnification factor.

In this way, when performing an edge extraction process according to an estimated magnification factor, it is possible to perform various types of image processing that enable accurate edge extraction, such as a process to change the threshold value for edge extraction, a thinning process, and the compression and magnification process described above.

In the present embodiment, the difference is calculated for each pixel in an image passed through a low-pass filter relative to a pixel in a corresponding image that has not been passed through a low pass filter, and then a total sum of these differences is calculated, but instead the difference may be calculated after calculating total sums.

Furthermore, instead of calculating the differences between an image passed through a low-pass filter and an image not passed through a low-pass filter, the magnification factor may be calculated according to the ratio between an image passed through a high-pass filter and an image not passed through a high-pass filter.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A magnification factor estimation device that estimates a magnification factor of an input image, comprising:
   a first calculating means that calculates a prescribed high frequency component of the input image, as a first spatial frequency component characteristic value;
   a second calculating means that calculates a spatial frequency component of the input image, as a second spatial frequency component characteristic value; and
   a magnification factor estimating means that estimates the magnification factor of the input image based on a ratio of the first spatial frequency component characteristic value to the second spatial frequency component characteristic value.

2. The magnification factor estimation device according to claim 1, wherein
   the first spatial frequency component characteristic value and the second spatial frequency component characteristic value are obtained by calculating, for each pixel, a one-pixel difference value that is a total sum of absolute values of differences in pixel values between the pixel and prescribed surrounding pixels, and calculating the total sum of the one-pixel difference values.

3. The magnification factor estimation device according to claim 2, further comprising:
   a determining means that determines whether each pixel is block noise, wherein
   the magnification factor estimating means removes pixels determined to be block noise by the determining means from the pixels that are targets in the total summation.

4. The magnification factor estimation device according to claim 3, wherein the determining means includes:
   a difference value calculating means that calculates differences between a pixel value of a pixel of interest and pixel values of a prescribed number of pixels in a left and right direction sandwiching the pixel of interest and differences between the pixel value of the pixel of interest and pixel values of a prescribed number of pixels in an up and down direction sandwiching the pixel of interest; and
   a block noise pixel determining means that determines the pixel of interest to be block noise when a trend of the calculated difference values is a one-direction increasing trend or a one-direction decreasing trend in both the left and right direction and the up and down direction.

5. The magnification factor estimation device according to claim 1, further comprising:
   a generating means that generates a high-frequency-removed image obtained by removing high frequency components of pixels positioned, with respect to a pixel of interest, in a horizontal direction, a vertical direction, and a diagonal direction in a rectangular pixel region, from the spatial frequency component of the input image.

6. An edge extraction threshold value calculation apparatus comprising:
   the magnification factor estimation device according to claim 1; and
   an edge extraction threshold value changing means that changes an edge extraction threshold value according to the magnification factor estimated by the magnification factor estimating means, such that the edge extraction threshold value is larger when the estimated magnification factor is larger and the edge extraction threshold value is smaller when the estimated magnification factor is smaller.

7. An edge calculation thinning apparatus comprising:
   the magnification factor estimation device according to claim 1; and
   a pixel thinning means that changes a thinning factor for thinning pixels of a target image for detecting an edge amount according to the magnification factor estimated by the magnification factor estimating means, such that the thinning factor is larger when the estimated magnification factor is larger and the thinning factor is smaller when the estimated magnification factor is larger.

8. An edge extraction apparatus comprising:
the magnification factor estimation device according to claim 1;
a compressing means that performs a compression process on the input image according to the magnification factor estimated by the magnification factor estimating means;
an edge extracting means that extracts an edge from the compressed image; and
a magnifying means that performs a magnification process on the image from which the edge is extracted, according to the magnification factor.

9. The magnification factor estimation device according to claim 1, wherein
the magnification factor estimating means estimates the magnification factor based on the ratio such that smaller values of the ratio result in higher values of the magnification factor.

10. A magnification factor estimating method for estimating a magnification factor of an input image, comprising:
calculating a prescribed high frequency component of the input image, as a first spatial frequency component characteristic value;
calculating a spatial frequency component of the input image, as a second spatial frequency component characteristic value; and
estimating the magnification factor of the input image based on a ratio of the first spatial frequency component characteristic value to the second spatial frequency component characteristic value.

11. The magnification factor estimating method according to claim 10, wherein
the first spatial frequency component characteristic value and the second spatial frequency component characteristic value are obtained by calculating, for each pixel, a one-pixel difference value that is a total sum of absolute values of differences in pixel values between the pixel and prescribed surrounding pixels, and calculating the total sum of the one-pixel difference values.

12. The magnification factor estimating method according to claim 10, wherein
the estimating includes calculating the magnification factor by subtracting 1 from the ratio.

13. The magnification factor estimation method according to claim 10, wherein
the estimating includes estimating the magnification factor based on the ratio such that smaller values of the ratio result in higher values of the magnification factor.

14. The magnification factor estimation method according to claim 10, further comprising calculating the ratio.

15. A magnification factor estimating method for estimating a magnification factor of an input image, comprising:
generating a high-frequency-removed image obtained by removing a prescribed high frequency component from a spatial frequency component of the input image;
calculating a spatial frequency component of each pixel in the high-frequency-removed image as a single-pixel high-frequency-removed image frequency component characteristic value, calculating a spatial frequency component of each pixel in the input image as a single-pixel second spatial frequency component characteristic value, and calculating a difference between each single-pixel high-frequency-removed image frequency component characteristic value and single-pixel second spatial frequency component characteristic value as a single-pixel first spatial frequency component characteristic value;
calculating a total sum of the single-pixel first spatial frequency component characteristic values of all of the pixels as a first spatial frequency component characteristic value and calculating a total sum of the single-pixel second spatial frequency component characteristic values for all of the pixels as a second spatial frequency component characteristic value; and
estimating the magnification factor of the input image based on a ratio of the first spatial frequency component characteristic value to the second spatial frequency component characteristic value.

16. The magnification factor estimation method according to claim 15, wherein
the estimating includes estimating the magnification factor based on the ratio such that smaller values of the ratio result in higher values of the magnification factor.

17. The magnification factor estimation method according to claim 15, further comprising calculating the ratio.

* * * * *